(12) United States Patent
Morita et al.

(10) Patent No.: US 11,855,475 B2
(45) Date of Patent: Dec. 26, 2023

(54) CHARGE/DISCHARGE CONTROL APPARATUS

(71) Applicant: Sumitomo Wiring Systems, Ltd., Yokkaichi (JP)

(72) Inventors: Kyohei Morita, Yokkaichi (JP); Hiroki Muramatsu, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/653,721

(22) Filed: Mar. 7, 2022

(65) Prior Publication Data

US 2022/0294254 A1 Sep. 15, 2022

(30) Foreign Application Priority Data

Mar. 9, 2021 (JP) ................................ 2021-037648

(51) Int. Cl.
*H02J 7/00* (2006.01)
*H02J 9/06* (2006.01)

(52) U.S. Cl.
CPC ...... *H02J 7/007182* (2020.01); *H02J 7/0063* (2013.01); *H02J 7/0068* (2013.01); *H02J 9/061* (2013.01); *H02J 2207/20* (2020.01)

(58) Field of Classification Search
CPC .. H02J 7/007182; H02J 7/0063; H02J 7/0068; H02J 9/061; H02J 2207/20; H02J 2310/46; H02J 2310/48; H02J 3/32; H02J 7/0048; H02J 9/06; H02J 7/1446
See application file for complete search history.

(56) References Cited

U.S. PATENT DOCUMENTS

2018/0291857 A1* 10/2018 Kinoshita ............. H02J 7/0029
2019/0064274 A1* 2/2019 Fu ....................... G01R 31/3828

FOREIGN PATENT DOCUMENTS

JP 2009-234489 A 10/2009

* cited by examiner

*Primary Examiner* — Lincoln D Donovan
*Assistant Examiner* — Alex W Lam
(74) *Attorney, Agent, or Firm* — Honigman LLP

(57) ABSTRACT

In a charge/discharge control apparatus, a voltage conversion unit performs voltage conversion between a second conductive path and a third conductive path. A first switch switches between an on state where a current is allowed to flow from a first conductive path to the second conductive path and an off state where the current is blocked. A second switch switches between an on state where a current is allowed to flow from the second conductive path to a second power path, and an off state where the current is blocked. An auxiliary charging unit switches between a supply state where power is supplied to a power storage unit via a path different from a path including the voltage conversion unit, based on power supplied via the first conductive path, and a stopped state where the supply of power via the path is stopped.

3 Claims, 6 Drawing Sheets

LEGEND:
A= Voltage conversion unit

LEGEND:
A= Voltage conversion unit

LEGEND:
A= Voltage conversion unit
B= Auxiliary charging circuit

CHARGE/DISCHARGE CONTROL APPARATUS

CROSS-REFERENCE TO RELATED APPLICATIONS

This application claims priority of Japanese Patent Application No. JP 2021-037648 filed on Mar. 9, 2021, the contents of which are incorporated herein.

TECHNICAL FIELD

The present disclosure relates to a charge/discharge control apparatus.

BACKGROUND

JP 2009-234489A discloses an electronic control brake power supply system for a vehicle. In the system disclosed in JP 2009-234489A, the backup power supply is provided with a first capacitor and a second capacitor. When the ignition switch of the vehicle is turned on, the first capacitor is charged by an alternator. When the ignition switch of the vehicle is turned off, the second capacitor is connected in parallel to the first capacitor and is charged by receiving a portion of the charge stored in the first capacitor.

JP 2009-234489A is an example of related art.

SUMMARY

When a power supply system installed in a vehicle or the like undergoes a power supply failure where power cannot be supplied from the power supply unit (main battery or the like) to a load, a backup operation is performed using power from a power storage unit that is different from the power supply unit. When this type of power supply system performs a backup operation, the voltage input to a voltage conversion unit (DC/DC converter, etc.) based on power from the power storage unit is converted to a desired output voltage by the voltage conversion unit and supplied as power to the load.

However, in this type of power supply system, if the voltage conversion unit starts up after a power supply failure has occurred, a certain amount of time is required for the voltage conversion unit to operate properly and output an appropriate voltage, and thus there may be a period of time where the load is not supplied with power. Accordingly, a configuration is desirable where the voltage conversion unit can be started up in the shortest time possible, and the voltage conversion unit can continue to operate for as long as possible. However, in this type of power supply system, the power storage unit used in the backup operation also needs to be charged at a desired timing. Coincidentally, if the voltage conversion unit needs to stop operating in order to be able to charge the power storage unit, in the case where the power supply failure occurs while the operation of the voltage conversion unit is stopped, a period of time occurs where the load is not supplied with power.

The present disclosure provides a technology with which, when a power supply failure regarding the power supply unit occurs, the occurrence of a period of time in which a load is not supplied with power can be suppressed.

A charge/discharge control apparatus, which is an aspect of the present disclosure, is a charge/discharge control apparatus that controls charge/discharge in a power supply system that includes a power supply unit, a power storage unit, a first power path that is a path for supplying a load with power that is based on the power supply unit, and a second power path that is a path for supplying the load with power that is based on the power storage unit. The charge/discharge control apparatus includes: a first conductive path that is a path on which power that is based on the power supply unit is transmitted; a second conductive path that is interposed between the second power path and the first conductive path; a third conductive path that is electrically connected to the power storage unit; a voltage conversion unit configured to perform voltage conversion between the second conductive path and the third conductive path; a first switch that is provided between the first conductive path and the second conductive path, and is configured to switch between an on state where a current is allowed to flow from the first conductive path to the second conductive path and an off state where the current is blocked; a second switch that is provided between the second conductive path and the second power path, and is configured to switch between an on state where a current is allowed to flow from the second conductive path to the second power path, and an off state where the current is blocked; and an auxiliary charging unit configured to switch between a supply state where power is supplied to the power storage unit via a path different from a path including the voltage conversion unit, based on power supplied via the first conductive path, and a stopped state where the supply of power to the power storage unit is stopped.

According to the technology regarding the present disclosure, when a power-supply failure regarding the power supply unit occurs, the occurrence of a period of time in which a load is not supplied with power can be suppressed.

DETAILED DESCRIPTION OF PREFERRED EMBODIMENTS

Figure 1:
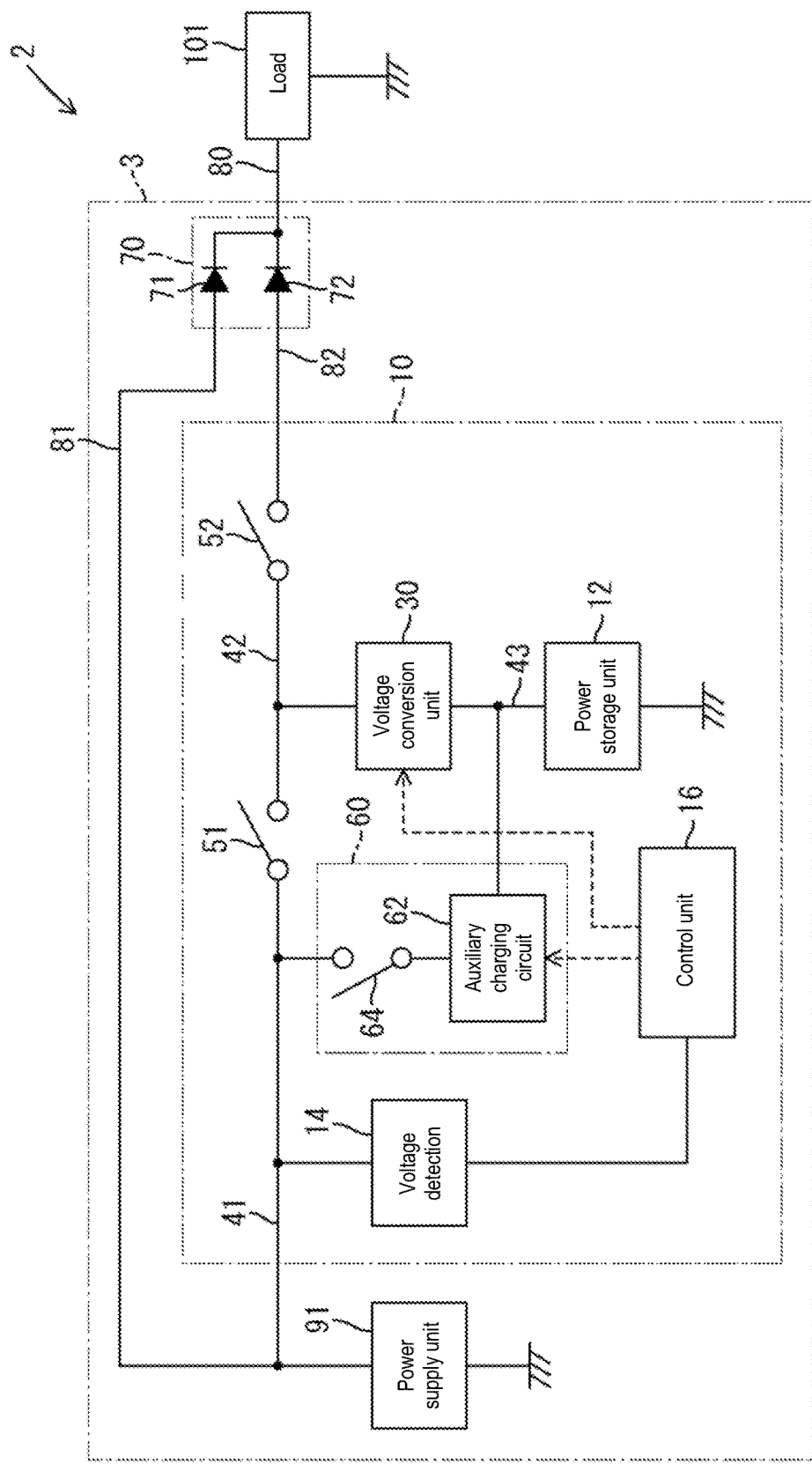
FIG. 1 is a circuit diagram schematically showing an example of an in-vehicle system including a charge/discharge control apparatus according to a first embodiment.

Embodiments of the present disclosure will be listed and described below. Note that the features of (1) to (4) described below may be combined provided that no contradiction arises.

(1) A charge/discharge control apparatus that controls charge/discharge in a power supply system that includes a power supply unit, a power storage unit, a first power path that is a path for supplying a load with power that is based on the power supply unit, and a second power path that is a path for supplying the load with power that is based on the power storage unit, the charge/discharge control apparatus including: a first conductive path that is a path on which power that is based on the power supply unit is transmitted; a second conductive path that is interposed between the second power path and the first conductive path; a third conductive path that is electrically connected to the power storage unit; a voltage conversion unit configured to perform voltage conversion between the second conductive path and the third conductive path; a first switch that is provided between the first conductive path and the second conductive path, and is configured to switch between an on state where a current is allowed to flow from the first conductive path to the second conductive path and an off state where the current is blocked; a second switch that is provided between the second conductive path and the second power path, and is configured to switch between an on state where a current is allowed to flow from the second conductive path to the second power path, and an off state where the current is blocked; and an auxiliary charging unit configured to switch between a supply state where power is supplied to the power storage unit via a path different from a path including the voltage conversion unit, based on power supplied via the first conductive path, and a stopped state where the supply of power to the power storage unit is stopped.

As a result of the charge/discharge control apparatus in (1) turning off the first switch and turning on the second switch, and the voltage conversion unit performing voltage conversion to apply an output voltage to the second conductive path, backup operation preparation can be performed. Provided that the backup operation preparation is performed prior to the occurrence of a power supply failure such as when power supplied from the power supply unit via the first power path is interrupted, this charge/discharge control apparatus can immediately continue the supply of power to the load immediately after the aforementioned power supply failure occurs. Furthermore, this charge/discharge control apparatus can perform the backup operation preparation while also charging the power storage unit by using the auxiliary charging unit. That is, this charge/discharge control apparatus can reduce the likelihood of a situation such as one where the backup operation preparation is interrupted while the power storage unit is being charged, and can easily prevent a situation such as when the backup operation is delayed due to a power supply failure occurring while the backup operation preparation is interrupted. In this way, the charge/discharge control apparatus in (1) has a highly advantageous configuration in terms of suppressing the occurrence of a period of time in which the load is not supplied with power when a power supply failure regarding the power supply unit occurs.

(2) The charge/discharge control apparatus in (1) has the following features. The charge/discharge control apparatus in (2) further includes a control unit. The control unit performs first control, second control, and third control. The first control is control that turns on the first switch while causing the voltage conversion unit to perform an operation of stepping up or stepping down the voltage applied to the second conductive path and applying the thus stepped-down or stepped-up voltage to the third conductive path. The second control is control that turns off the first switch and turns on the second switch, sets the auxiliary charging unit to the stopped state, and causes the voltage conversion unit to perform an operation of stepping up or stepping down the voltage applied to the third conductive path and applying the thus stepped-up or stepped-down voltage to the second conductive path. The third control is control that turns off the first switch and turns on the second switch, sets the auxiliary charging unit to the supply state, and causes the voltage conversion unit to perform a conversion operation of stepping up or stepping down the voltage applied to the third conductive path and applying the thus stepped-up or stepped-down voltage to the second conductive path.

The charge/discharge control apparatus in (2) can use the voltage conversion unit to charge the power storage unit as a result of the control unit performing the first control, and can use the voltage conversion unit to discharge the power storage unit as a result of the control unit performing the second control. That is, the charge/discharge control apparatus in (2) can switch between charging and discharging the power storage unit using the voltage conversion unit according to the first control and the second control. Furthermore, if a situation in which the power storage unit is to be charged during the second control (that is, during an operation where the voltage conversion unit is used to apply a voltage to the second power path) occurs, the charge/discharge control apparatus in (2) can also switch from the second control to the third control. In this case, the charge/discharge control apparatus can raise the charging voltage of the power storage unit while also continuing "an operation of applying a voltage to the second power path (backup preparation operation)", thus making it possible to avoid a situation where the preparation operation is interrupted while the power storage unit is being charged.

(3) The charge/discharge control apparatus according to (2) has the following features. If the power supply system enters a predetermined reduced voltage state where the voltage of the first power path is lower than the voltage of the second power path occurs, power is supplied to the load via the second power path, and if the power supply system enters a normal state that is not the predetermined reduced voltage state, the supply of power to the load via the second power path is blocked, and, in a case of performing the second control, the control unit causes the voltage conversion unit to perform the conversion operation such that an output voltage that realizes the normal state is applied to the second conductive path, and if a predetermined condition is met while the second control is being performed, the control unit switches to the third control.

If the power supply system that uses the charge/discharge control apparatus described in (3) enters a predetermined reduced voltage state where the voltage of the first power path is lower than the voltage of the second power path, power is supplied to the load via the second power path. Accordingly, provided that the preparation operation is being performed such that a suitable voltage is applied to the second power path according to the second control, power can be immediately supplied to the load via the second power path, even if there is a large decrease in the voltage of the first power path. Furthermore, as a result of the charge/discharge control apparatus in (3) switching from the second control to the third control when the predetermined condition is met during the second control, the charge/discharge control apparatus can continuously charge the power storage unit without a large interruption in the preparation operation. In the third control as well, provided that the preparation operation is being performed such that an appropriate voltage is applied to the second power path, power can be immediately supplied to the load via the second power path even when there is a large decrease in the voltage of the first power path.

(4) In the charge/discharge apparatus described in (3), the predetermined condition is that the output voltage applied to the third conductive path by the power storage unit falls to a threshold value or below.

If the output voltage applied to the third conductive path by the power storage unit falls to the threshold value or below, the charge/discharge control apparatus described in (4) can continuously charge the power storage unit without a large interruption in the preparation operation. Thus, the charge/discharge control apparatus in (4) can avoid a situation such as one where the preparation operation is continued in a state where the output voltage of the power storage unit has fallen below the threshold value, and thus a situation where the output voltage of the power storage unit is excessively low during the backup operation that corresponds to the power supply failure is unlikely to occur. Furthermore, the charge/discharge control apparatus in (4) does not need to largely interrupt the preparation operation for such measures.

First Embodiment

1. Overview of In-Vehicle System

FIG. 1 shows an in-vehicle system 2. The in-vehicle system 2 shown in FIG. 1 mainly includes an in-vehicle power supply system 3 and a load 101. The in-vehicle power supply system 3 is also referred to as the power supply system 3 in the following description. The in-vehicle system 2 is a system that uses the power supply system 3 to supply power to the load 101, and causes the load 101 to operate. The load 101 is illustrated as a load in FIG. 1, but another load may be provided in the in-vehicle system 2.

The load 101 is an electric component installed in a vehicle. The load 101 operates by receiving power via a shared power path 80. The type of the load 101 is not limited. Various known in-vehicle components can be employed as the load 101. The load 101 may include a plurality of electric components or be a single electric component.

The power supply system 3 is a system that supplies power to the load 101. The power supply system 3 supplies power to the load 101 with a power supply unit 91 or a power storage unit 12 serving as a power supply source. The power supply system 3 can supply power to the load 101 from the power supply unit 91, and when the supply of power from the power supply unit 91 is interrupted by a failure or the like, power can be supplied to the load 101 from the power storage unit 12.

2. Overview of Power Supply System

The power supply system 3 includes the power supply unit 91, the power storage unit 12, a charge/discharge control apparatus 10, a first power path 81, a second power path 82, and a selection unit 70.

The power supply unit 91 is an in-vehicle power source that can supply power to the load 101. The power supply unit 91 is configured, for example, as a known in-vehicle battery such as a lead battery. The power supply unit 91 may be configured as a battery other than a lead battery, or may include a non-battery power supply means in place of a battery or in addition to a battery. A positive electrode of the power supply unit 91 is electrically connected to the first power path 81 in a short circuit configuration with the first power path 81. A negative electrode of the power supply unit 91 is electrically connected to the ground in a short circuit configuration with the ground. The power supply unit 91 applies a direct current voltage of a fixed value to the first power path 81. The voltage applied by the power supply unit 91 to the first power path 81 may slightly fluctuate from the fixed value.

The power storage unit 12 is a power source that acts as a power supply source at least when the supply of power from the power supply unit 91 is interrupted. The power storage unit 12 is, for example, configured by a known power storage means such as an electric double layered capacitor (EDLC). The power storage unit 12 may be configured by a capacitor other than an electric double layered capacitor, or may include another power storage means (such as a battery) in place of the capacitor or in addition to the capacitor. A positive electrode of the power storage unit 12 is electrically connected to a third conductive path 43 in a short circuit configuration with the third conductive path 43. A negative electrode of the power storage unit 12 is electrically connected to the ground in a short circuit configuration with the ground. The output voltage of the power storage unit 12 (the voltage applied to the third conductive path 43 by the power storage unit 12) may be greater or smaller than the output voltage of the power supply unit 91 (the voltage applied to the first power path 81 by the power supply unit 91). In a representative example described below, the output voltage of the power supply unit 91 when fully charged is greater than the output voltage of the voltage conversion unit 30 (the voltage output to the second conductive path 42). The output voltage output by the power storage unit 12 may be greater or lower than the output voltage of the power supply unit 91, or may be variable. In the representative example described below, the voltage output by the power storage unit 12 (the voltage applied to the third conductive path 43) when the power storage unit 12 is discharging can be stepped up or stepped down by the voltage conversion unit 30 to be slightly lower than the output voltage of the power supply unit 91 and output to the second conductive path 42.

In the present specification, the voltages are not particularly limited, and are voltages relative to a ground potential (for example, 0 V) and are potential differences from the ground potential. For example, the voltage applied to the first power path 81 is the potential difference between the potential of the first power path 81 and the ground potential. The voltage applied to the third conductive path 43 is the potential difference between the potential of the third conductive path 43 and the ground potential.

The first power path 81 is a path on which power that is based on the power supply unit 91 is transmitted, and on which power that is based on the power supply unit 91 is supplied to the load 101. In the example shown in FIG. 1, a voltage of the same or substantially the same magnitude as the output voltage of the power supply unit 91 is applied to the first power path 81. One end of the first power path 81 is electrically connected to the positive electrode of the power supply unit 91 in a short circuit configuration with the positive electrode of the power supply unit 91. The other end of the first power path 81 is electrically connected to an anode of a diode 71. The first power path 81 is electrically connected to a first conductive path 41 in a short circuit configuration with the first conductive path 41. A relay or a fuse may be provided on the first power path 81.

The second power path 82 is a path on which power that is based on the power storage unit 12 is transmitted. When a power supply failure occurs, the second power path 82 functions as a path on which power that is based on the power storage unit 12 is supplied to the load 101. One end of the second power path 82 is electrically connected to another end of a second switch 52, and the other end of the second power path 82 is electrically connected to an anode of a diode 72.

The selection unit 70 is a circuit that selects whether power that is based on the power supply unit 91 or power that is based on the power storage unit 12 is supplied to the load 101. The selection unit 70 includes the diodes 71 and 72.

The anode of the diode 71 is electrically connected to the first power path 81. A voltage that is based on the power supply unit 91 is applied to the anode of the diode 71. In the example shown in FIG. 1, the potential of the anode of the diode 71 is the same as the potential of the first power path 81, and the anode of the diode 71 and the positive electrode of the power supply unit 91 are short-circuited. The anode of the diode 72 is electrically connected to the second power path 82. The potential of the anode of the diode 72 is the same as the potential of the second power path 82. The cathodes of both of the diodes 71 and 72 are electrically connected to the shared power path 80, and both cathodes have the same potential as the shared power path 80. The shared power path 80 is a conductive path that is electrically connected to the load 101. If the potential of the first power path 81 is greater than the potential of the second power path 82, the selection unit 70 allows a current to flow from the first power path 81 to the shared power path 80 and does not allow a current to flow from the second power path 82 to the shared power path 80. If the potential of second power path 82 is greater than the potential of the first power path 81, the selection unit 70 allows a current to flow from the second power path 82 to the shared power path 80 and does not allow a current to flow from the first power path 81 to the shared power path 80.

3. Details of Charge/Discharge Control Apparatus

The charge/discharge control apparatus 10 is a backup apparatus that can output power that is based on the power storage unit 12. The charge/discharge control apparatus 10 includes the first conductive path 41, the second conductive path 42, the third conductive path 43, the first switch 51, the second switch 52, the voltage conversion unit 30, an auxiliary charging unit 60, a voltage detection unit 14, a control unit 16, the power storage unit 12, and the like.

The first conductive path 41 is a path on which power that is based on the power supply unit 91 is transmitted. A voltage of the same or substantially the same magnitude as the output voltage of the power supply unit 91 is applied to the first conductive path 41. One end of the first conductive path 41 is electrically connected to the first power path 81. The potential of the first conductive path 41 is, for example, the same potential as a part or all of the first power path 81. The other end of the first conductive path 41 is electrically connected to one end of the first switch 51.

The second conductive path 42 is a conductive path that is interposed between the second power path 82 and the first conductive path 41, and is also interposed between the first conductive path 41 and the voltage conversion unit 30. When the later-described first switch 51 is on, the first conductive path 41 and the second conductive path 42 are short-circuited via the first switch 51. When the later-described second switch 52 is on, the second conductive path 42 and the second power path 82 are short-circuited by the second switch 52.

The third conductive path 43 is a conductive path that is electrically connected to the power storage unit 12, and is also electrically connected to one end of the voltage conversion unit 30. While the voltage conversion unit 30 is stopped, the output voltage of the power storage unit 12 is applied to the third conductive path 43.

The first switch 51 is a switch that is provided between the first conductive path 41 and the second conductive path 42. The first switch 51 switches between an on state where a current is allowed to flow from the first conductive path 41 to the second conductive path 42, and an off state where the current is blocked. For example, when the first switch 51 is on, a current is allowed to flow both ways between the first conductive path 41 and the second conductive path 42. When the first switch 51 is off, a current is blocked from flowing between the first conductive path 41 and the second conductive path 42.

The second switch 52 is a switch that is provided between the second conductive path 42 and the second power path 82. The second switch 52 switches between an on state where a current is allowed to flow from the second conductive path 42 to the second power path 82, and an off state where the current is blocked. For example, when the second switch 52 is on, a current is allowed to flow both ways between the second conductive path 42 and the second power path 82. When the second switch 52 is off, a current is blocked from flowing between the second conductive path 42 and the second power path 82.

The voltage conversion unit 30 is an apparatus that performs voltage conversion between the second conductive path 42 and the third conductive path 43. The voltage conversion unit 30 is configured by a known voltage conversion circuit such as a DC/DC converter. The voltage conversion unit 30 can perform a first conversion operation of stepping down or stepping up the direct current voltage applied to the second conductive path 42, and applying the voltage as an output voltage to the third conductive path 43. For example, as a result of the voltage conversion unit 30 performing the first conversion operation when the first switch 51 is on, a charging current that is based on power from the power supply unit 91 is supplied to the power storage unit 12. The voltage conversion unit 30 can perform a second conversion operation of stepping down or stepping up a direct current voltage applied to the third conductive path 43, and applying the voltage as an output voltage to the second conductive path 42. For example, as a result of the voltage conversion unit 30 performing the second conversion operation when the first switch 51 is off and the second switch 52 is on, a direct current voltage that is based on power from the power storage unit 12 is applied to the second conductive path 42 and the second power path 82. The operations of the voltage conversion unit 30 are controlled by the control unit 16.

The auxiliary charging unit 60 is an apparatus that charges the power storage unit 12 via a path different from a path that includes the voltage conversion unit 30. The auxiliary charging unit 60 includes a third switch 64 and an auxiliary charging circuit 62. The auxiliary charging unit 60 switches between a supply state where power is supplied to the power storage unit 12 via a path different from a path including the voltage conversion unit 30, based on power supplied via the first conductive path 41, and a stopped state where the supply of power via the path is stopped. The path different from the path including the voltage conversion unit 30 is a path that passes through the third switch 64 and the auxiliary charging circuit 62, and does not pass through the first switch 51 and the voltage conversion unit 30.

The third switch 64 switches the state between the first conductive path 41 and the auxiliary charging circuit 62 between a conductive state and a blocked state. When the third switch 64 is on, power is supplied from the power supply unit 91 to the auxiliary charging circuit 62 via the first conductive path 41 and the third switch 64. When the third switch 64 is off, a current is blocked from flowing in both directions via the third switch 64, and is blocked from flowing from the first conductive path 41 to the auxiliary charging circuit 62.

The auxiliary charging circuit 62 is a circuit that can supply a charging current to the power storage unit 12 when the third switch 64 is on. The auxiliary charging circuit 62 may be a low dropout regulator (LDO), a DC/DC converter, or another charging circuit. If another charging circuit is to be used, various methods such as constant-voltage charging, constant-current charging, constant current/constant voltage charging, and the like can be employed.

The control unit 16 is an information processing apparatus that includes an information processing function, an arithmetic function, a control function, and the like. The control unit 16 can perform control that causes the voltage conversion unit 30 to perform the first conversion operation and control that causes the voltage conversion unit 30 to perform the second conversion operation. The control unit 16 turns the first switch 51, the second switch 52, and the third switch 64 on and off. The control unit 16 performs first control, second control, and third control, which are described later.

The voltage detection unit 14 is a circuit that outputs an analog voltage value that is a value with which the value of the voltage applied to the first conductive path 41 can be specified. The voltage detection unit 14 may be a circuit that inputs the same voltage value as the value of the voltage applied to the first conductive path 41 to the control unit 16, or a circuit that inputs a value in proportion to the value of the voltage applied to the first conductive path 41 to the control unit 16. In the example shown in FIG. 1, for example, the voltage detection unit 14 is a voltage divider, and a value obtained by using the voltage divider to divide the value of the voltage applied to the first conductive path 41 is input to the control unit 16 as a detection value. The control unit 16 specifies the value of the voltage applied to the first conductive path 41 based on the detection value (analog voltage value) received from the voltage detection unit 14.

In the charge/discharge control apparatus 10 shown in FIG. 1, the first switch 51, the second switch 52, and the third switch 64 may each be a semiconductor switch such as an FET, or a mechanical relay.

4. Charge/Discharge Control Apparatus Operations (First Control)

Figure 2:
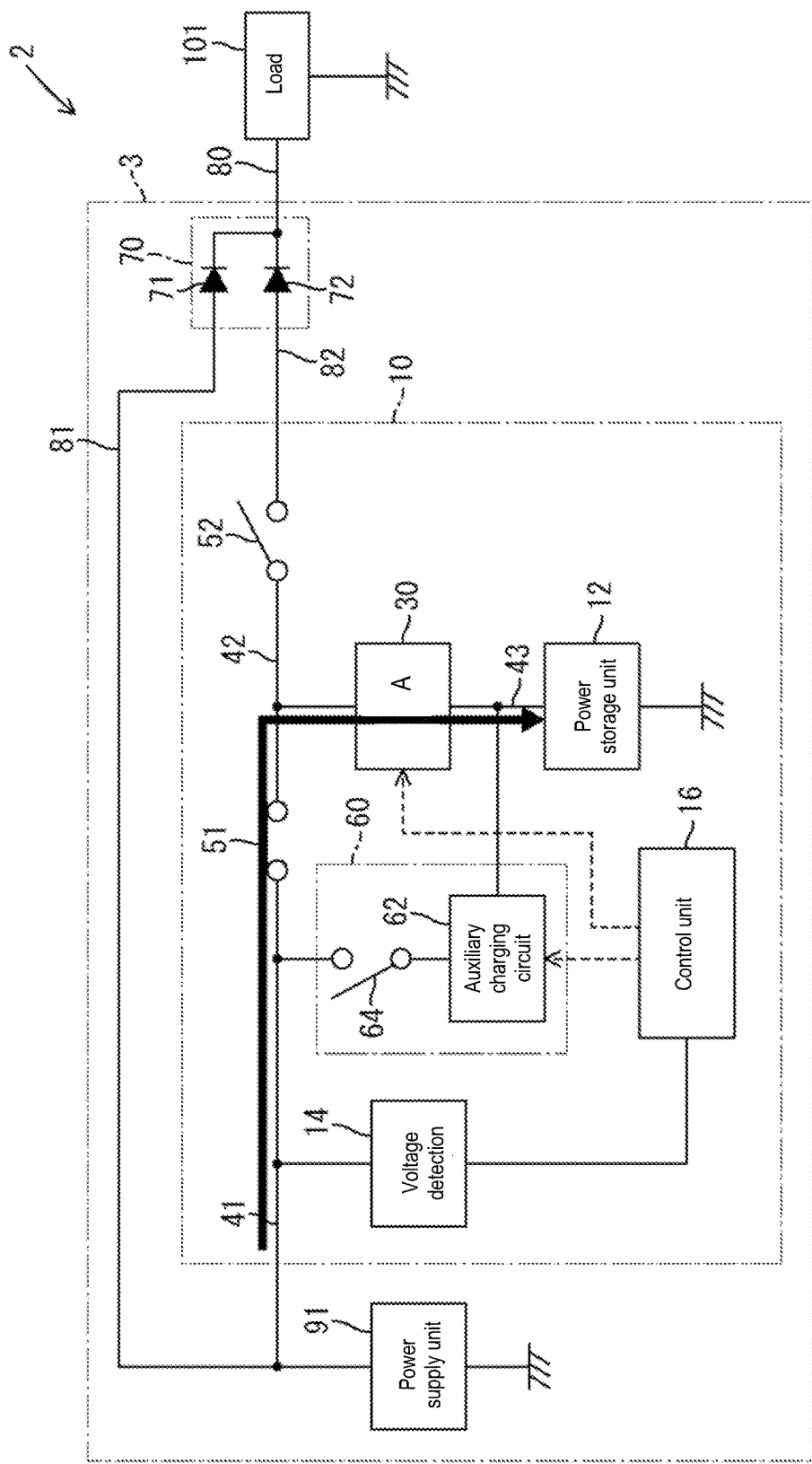
FIG. 2 is a descriptive diagram for describing control (first control) performed in the in-vehicle system shown in FIG. 1 when the charge/discharge control apparatus of the first embodiment charges a power storage unit.

FIG. 2 is a diagram for describing the first control. If a predetermined first condition is met, the control unit 16 initiates the first control. The "first condition" may, for example, be the condition "the vehicle enters a start-up state", or another condition. For example, in a case where the vehicle in which the in-vehicle system 2 is installed enters a start-up state (a case where a start-up switch such as an ignition switch is turned on), the control unit 16 determines that the first condition is met and initiates the first control.

The first control is control in which the power storage unit 12 is charged using a first charging method. Specifically, the first control is control that turns on the first switch 51 while causing the voltage conversion unit 30 to perform an operation of stepping down the voltage applied to the second conductive path 42 and applying the thus stepped-down voltage to the third conductive path 43. In the example shown in FIG. 2, the control unit 16 performs the first control so as to turn off the third switch 64 in addition to the second switch 52. For example, the control unit 16 performs the first control by setting the charge voltage of the fully charged power storage unit 12 as a first target value, and setting the output voltage to be applied to the third conductive path 43 by the voltage conversion unit 30 to the first target value. The control unit 16 executes the first control until the termination condition of the first control is met. The termination condition of the first control may be the condition that the charge voltage of the power storage unit 12 reaches a predetermined value (for example, a later-described second threshold value), the condition that a fixed period of time has elapsed from when the first control was initiated, or another condition.

While the control unit 16 is performing the first control, as shown in FIG. 2, the first switch 51 is kept on while the second switch 52 and the third switch 64 are kept off, and the voltage conversion unit 30 performs the first conversion operation. Due to this operation, a charging current that is based on power from the power supply unit 91 is supplied to the power storage unit 12, as shown by the bold arrow illustrated in FIG. 2. Note that, the second switch 52 may be on while the control unit 16 is performing the first control.

(Second Control)

Figure 3:
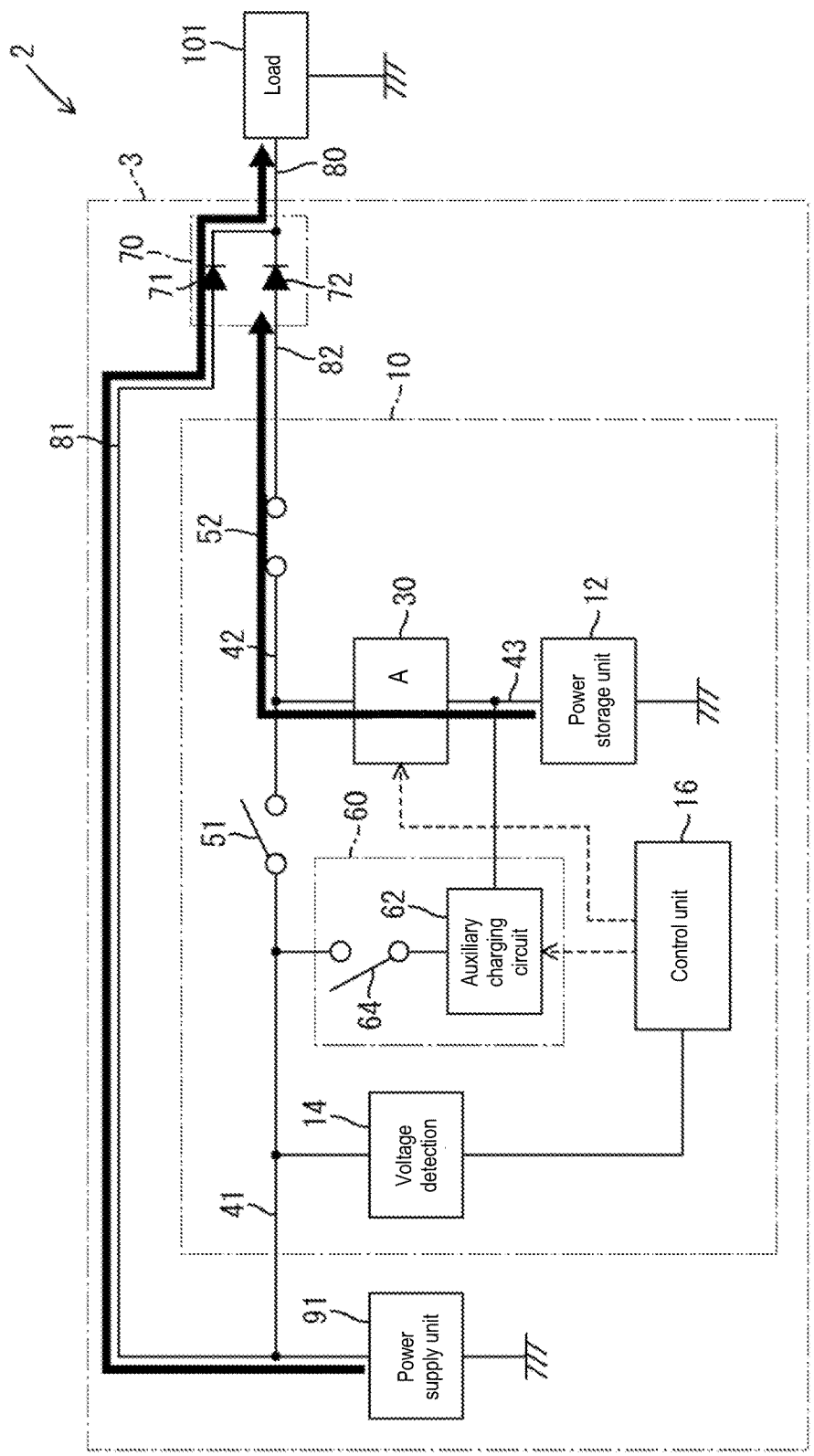
FIG. 3 is a descriptive diagram for describing control (second control) performed in the in-vehicle system shown in FIG. 1 when the charge/discharge control apparatus of the first embodiment performs backup preparation.

FIG. 3 is a diagram for describing the second control. When a predetermined second condition is met, the control unit 16 initiates the second control. The "second condition" may be, for example, the condition "the first control has ended", the condition "the third control has ended", or another condition. The second control is control that stops charging of the power storage unit 12 and causes the power storage unit 12 to discharge. Specifically, the second control is control that turns off the first switch 51 and turns on the second switch 52, sets the auxiliary charging unit 60 to a stopped state, and causes the voltage conversion unit 30 to perform an operation of stepping up the voltage applied to the third conductive path 43 and applying the thus stepped-up voltage to the second conductive path 42. In the example shown in FIG. 3, the control unit 16 performs the second control so as to turn off the third switch 64 in addition to the first switch 51. The control unit 16 performs the second control to set a second target value to a value that is greater than the charging voltage of the fully charged power storage unit 12 and is slightly smaller than the charging voltage of the fully charged power supply unit 91, and set the output voltage to be applied to the second conductive path 42 by the voltage conversion unit 30 to the second target value.

While the control unit 16 is performing the second control, as shown in FIG. 3, the second switch 52 is kept on while the first switch 51 and the third switch 64 are kept off, and the voltage conversion unit 30 performs the second conversion operation. Due to this operation, a voltage that is based on power from the power storage unit 12 is applied to the second power path 82 as shown by a bold arrow illustrated in FIG. 3. It should be noted that the above-described example is but one example, and, for example, if the second switch 52 is kept off and a monitoring unit (for example, the voltage detection unit 14 and the control unit 16) detects that the output voltage of the power supply unit 91 has fallen to a predetermined value or below while the control unit 16 is performing the second control, the control unit 16 may immediately turn on the second switch 52.

The voltage applied by the voltage conversion unit 30 to the second conductive path 42 according to the second control is slightly smaller than the voltage applied to the first power path 81 when the power supply unit 91 is fully charged. Thus, if the power supply unit 91 is fully charged and in a normal state (not in a failure state, and able to appropriately supply power that is based on the power supply unit 91 to the load 101), as shown in FIG. 3, a current is allowed to flow from the first power path 81 to the shared power path 80, and a current is not allowed to flow from the second power path 82 to the shared power path 80. Specifically, if the voltage applied to the end of the first power path 81 (anode of the diode 71) is greater than the voltage applied to the end of the second power path 82 (anode of the diode 72), only the current from the first power path 81, and not the current from the second power path 82, flows to the shared power path 80, as shown in FIG. 3.

Figure 4:
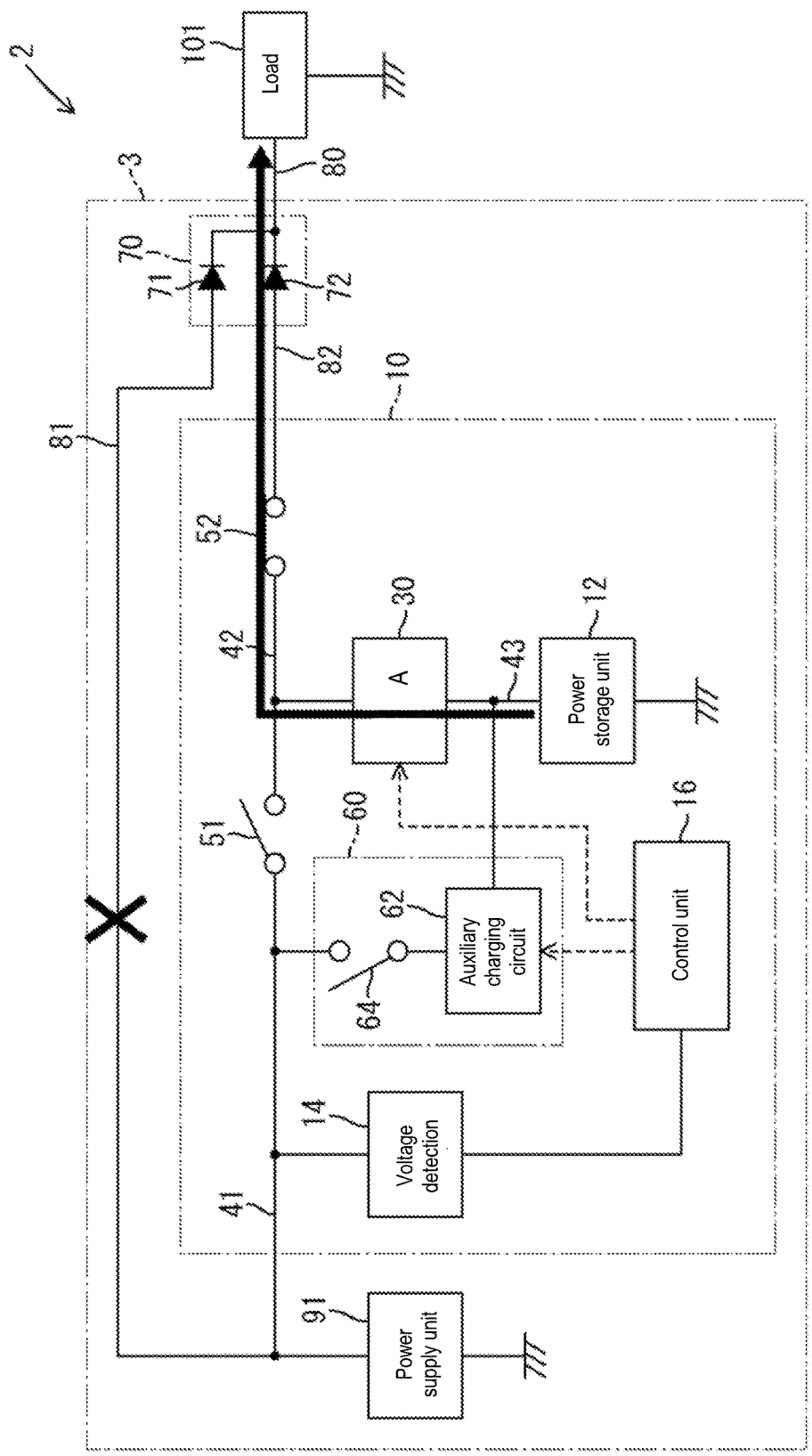
FIG. 4 is a descriptive diagram for describing the occurrence of a power supply failure where power supply from the power supply unit is interrupted during the second control in the in-vehicle system shown in FIG. 1.

Note that, if, for some reason, the voltage applied to the first power path 81 falls below the voltage applied to the second power path 82 while the second control is being performed, a current immediately flows from the second power path 82 to the shared power path 80, as shown in FIG. 4. Specifically, if the voltage applied to the end of the first power path 81 (anode of the diode 71) is smaller than the voltage applied to the end of the second power path 82 (anode of the diode 72), only the current from the second power path 82, and not the current from the second power path 82, flows to the shared power path 80, as shown in FIG. 4.

(Third Control)

Figure 5:
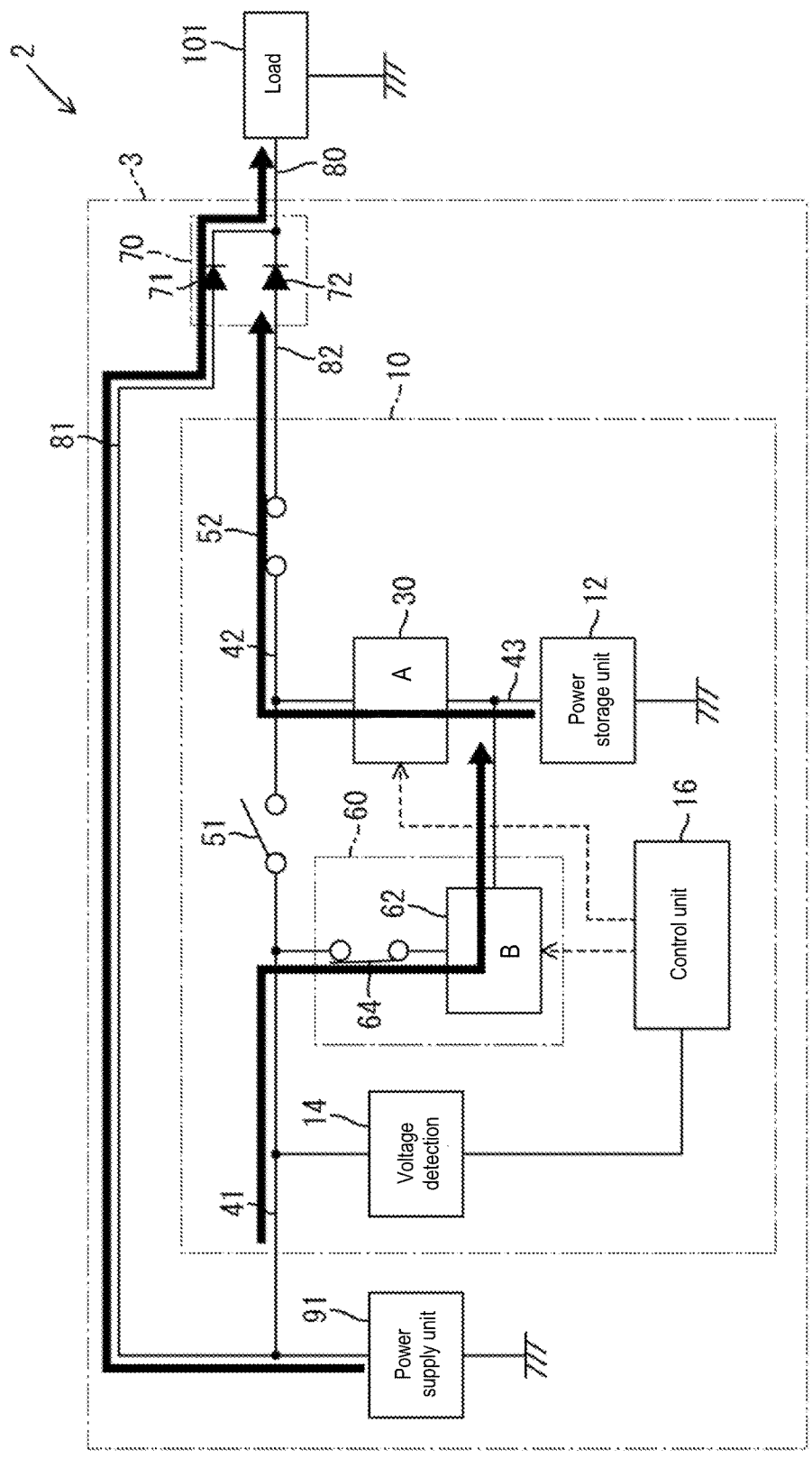
FIG. 5 is a descriptive diagram for describing a case where the charge/discharge control apparatus of the first embodiment performs backup preparation while charging the power storage unit (third control) in the in-vehicle system shown in FIG. 1.

FIG. 5 is a diagram for describing the third control. When a predetermined third condition is met, the control unit 16 initiates the third control. The "third condition" may be, for example, the condition "the output voltage applied to the third conductive path 43 by the power storage unit 12 has fallen to a threshold value or below while the second control is being executed" or another condition. In the representative example described below, the third condition is the condition "the output voltage applied to the third conductive path 43 by the power storage unit 12 has fallen to a threshold value (first threshold value) or below while the second control is being executed". The threshold value (first threshold value) is greater than 0 and smaller than the output voltage of the fully charged power storage unit 12. This threshold value (first threshold value) may be a predetermined fixed value, or a value that can be updated or changed.

The third control is control that turns the first switch 51 off and turns the second switch 52 on, sets the auxiliary charging unit 60 to a supply state (a state where a charging current is supplied to the power storage unit 12), and causes the voltage conversion unit 30 to perform a voltage conversion operation of stepping up (or stepping down) the voltage applied to the third conductive path 43 and applying the thus stepped-up (or stepped-down) voltage to the second conductive path 42. In the example shown in FIG. 3, the control unit 16 executes the third control to turn on the third switch 64 and cause the auxiliary charging circuit 62 to perform the operation of supplying a charging current to the power storage unit 12, the charging current being based on power from the power supply unit 91 (power supplied via the first conductive path 41). When the third control is performed in this manner, a current that is based on power from the power supply unit 91 is supplied to the power storage unit 12 via the auxiliary charging unit 60 without passing through the first switch 51, while a voltage that is based on power from the power storage unit 12 is applied to the second power path 82, as shown by the bold arrows in FIG. 5. Note that the control unit 16 terminates the third control if a predetermined termination condition is met while the third control is being executed. The predetermined termination condition may be that the start-up switch of the vehicle in which the in-vehicle system 2 is installed has been turned off, or that the charging voltage of the power storage unit 12 has reached a second threshold value. The second threshold value in this case may be greater than the threshold value (first threshold value). The second threshold value may be the charging voltage of the fully charged power storage unit 12, for example. When the third control is terminated in response to the charging voltage of the power storage unit 12 reaching the second threshold value while the third control is being executed, the control unit 16 may change the control from the third control to the second control.

In the third control as well, the voltage applied to the second conductive path 42 by the voltage conversion unit 30 according to the third control is slightly smaller than the voltage applied to the first power path 81 when the power supply unit 91 is fully charged. Thus, if the power supply unit 91 is fully charged and in a normal state (not in a failure state, and able to appropriately supply power that is based on the power supply unit 91 to the load 101), a current is allowed to flow from the first power path 81 to the shared power path 80, and a current is allowed to flow from the second power path 82 to the shared power path 80, as shown in FIG. 5. In this example as well, if the voltage applied to the end of the first power path 81 (anode of the diode 71) is greater than the voltage applied to the end of the second power path 82 (anode of the diode 72), only the current from the first power path 81, and not the current from the second power path 82, flows to the shared power path 80, as shown in FIG. 5.

Figure 6:
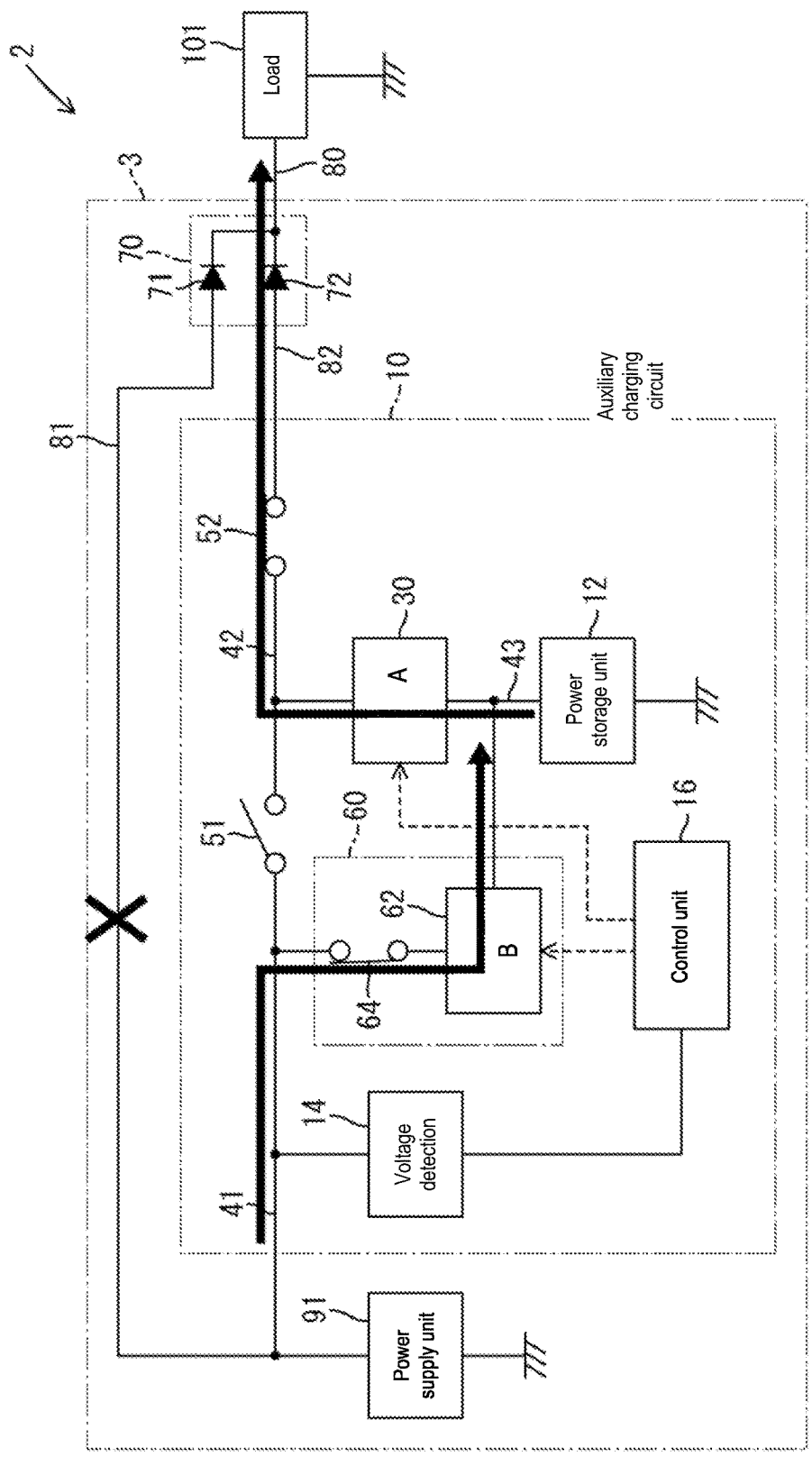
FIG. 6 is a descriptive diagram for describing the occurrence of a power supply failure where power supply from the power supply unit is interrupted during the third control in the in-vehicle system shown in FIG. 1.

Note that, if, for some reason, the voltage applied to the first power path 81 falls below the voltage applied to the second power path 82 while the third control is being performed, a current immediately flows from the second power path 82 to the shared power path 80, as shown in FIG. 6. Specifically, if the voltage applied to the end of the first power path 81 (anode of the diode 71) is smaller than the voltage applied to the end of the second power path 82 (anode of the diode 72), only the current from the second power path 82, and not the current from the second power path 82, flows to the shared power path 80, as shown in FIG. 6.

5. Examples of Effects

As a result of the charge/discharge control apparatus 10 turning off the first switch 51 and turning on the second switch 52, and the voltage conversion unit 30 performing voltage conversion to apply an output voltage to the second conductive path 42, backup operation preparation (standing by in a state where a voltage is applied to the second power path 82) can be performed. Provided that the "backup operation preparation" is performed prior to the occurrence of a power supply failure (specifically, a power supply failure such as when power supplied from the power supply unit 91 via the first power path 81 is interrupted), this charge/discharge control apparatus 10 can immediately continue the supply of power to the load 101 immediately after a power supply failure occurs. Furthermore, the charge/discharge control apparatus 10 can continue the "backup operation preparation" by using the voltage conversion unit 30 while also charging the power storage unit 12 using the auxiliary charging unit 60. That is, the charge/discharge control apparatus 10 can also charge the power storage unit 12 without interrupting the backup operation preparation (standby in the voltage application state), and thus "a situation where the backup operation is delayed due to a power supply failure occurring while the backup operation preparation is interrupted" can be easily prevented. In this way, the charge/discharge control apparatus 10 has a highly advantageous configuration in terms of "suppressing the occurrence of a period of time in which the load 101 is not supplied with power when a power supply failure regarding the power supply unit 91 occurs".

The charge/discharge control apparatus 10 can charge the power storage unit 12 by using the voltage conversion unit 30 as a result of the control unit 16 performing the first control, and can discharge the power storage unit 12 using the voltage conversion unit 30 as a result of the control unit 16 performing the second control. That is, the charge/discharge control apparatus 10 can switch between charging and discharging the power storage unit 12 using the voltage conversion unit 30 by switching between the first control and the second control. Furthermore, if a situation where the power storage unit 12 is to be charged during the second control (that is, during an operation where the voltage conversion unit 30 is used to apply a voltage to the second power path 82) occurs, it is sufficient for the charge/discharge control apparatus 10 to switch from the second control to the third control. In this case, the charge/discharge control apparatus 10 can raise the charging voltage of the power storage unit 12 while also continuing the operation of applying a voltage to the second power path 82 (backup preparation operation), thus making it possible to avoid a situation where the preparation operation is interrupted while the power storage unit 12 is being charged.

In the power supply system 3, when a "predetermined reduced voltage state" occurs, power is immediately supplied to the load 101 via the second power path 82. Accordingly, provided that the second control is being performed such that a suitable voltage is applied to the second power path 82, the charge/discharge control apparatus 10 can immediately supply power to the load 101 via the second power path 82, even if there is a large decrease in the voltage of the first power path 81 during the second control. Furthermore, when the predetermined condition is met during the second control, the charge/discharge control apparatus 10 can switch from the second control to the third control to continuously charge the power storage unit 12 without a large interruption in the preparation operation. In the third control as well, provided that the third control is being performed such that an appropriate voltage is applied to the second power path 82, power can be immediately supplied to the load 101 via the second power path 82, even when there is a large decrease in the voltage of the first power path 81 during the second control.

If the output voltage applied to the third conductive path 43 by the power storage unit 12 falls to the threshold value or below, the charge/discharge control apparatus 10 can continuously charge the power storage unit 12 without a large interruption in the preparation operation. Thus, the charge/discharge control apparatus 10 can avoid a situation where the preparation operation is continued in a state where the output voltage of the power storage unit 12 has fallen below the threshold value, and thus a situation where the output voltage of the power storage unit 12 is excessively low during the backup operation that corresponds to the power supply failure is unlikely to occur. Furthermore, the charge/discharge control apparatus 10 does not need to largely interrupt the preparation operation for such measures.

Other Embodiments

The present disclosure is not limited to the embodiment described using the above description and drawings. For example, the features of the embodiments described above and below can be combined in various ways provided that no contradiction arises. Also, any features of the embodiments described above or below can be omitted unless they are clearly described as being essential. Furthermore, the above-described embodiment may be changed in the following manner.

In the first embodiment, the charge/discharge control apparatus 10 includes the power storage unit 12, but a configuration may be employed where the power storage unit 12 is provided outside the charge/discharge control apparatus 10. That is, the charge/discharge control apparatus 10 does not necessarily need to include the power storage unit 12.

In the first embodiment, the output voltage of the fully charged power storage unit 12 is smaller than the output voltage of the fully charged power supply unit 91, but the output voltage of the power storage unit 12 may be larger than the output voltage of the fully charged power supply unit 91. In this case, the first control may be control that turns on the first switch 51 while making the voltage conversion unit 30 perform the operation of stepping up the voltage applied to the second conductive path 42 and applying the thus stepped-up voltage to the third conductive path 43. The second control may be control that turns off the first switch 51 and turns on the second switch 52, sets the auxiliary charging unit 60 to a stopped state (a state where a current is not supplied to the power storage unit 12), and causes the voltage conversion unit 30 to perform the operation of stepping down the voltage applied to the third conductive path 43 and applying the thus stepped-down voltage to the second conductive path 42. The third control may be control that turns off the first switch 51 and turns on the second switch 52, sets the auxiliary charging unit 60 to a supply state (a state where a current is supplied to the power storage unit 12), and causes the voltage conversion unit 30 to perform the conversion operation of stepping down the voltage applied to the third conductive path 43 and applying the thus stepped-down voltage to the second conductive path 42.

In the power supply system 3, if the predetermined reduced voltage state, in which the voltage of the first power path 81 is smaller than the voltage of the second power path 82, occurs while the second control or the third control is being performed, power is supplied to the load 101 via the second power path. Regarding this point, in the first embodiment, the "predetermined reduced voltage state" is a state where the voltage of the first power path 81 is smaller than the voltage of the second power path 82, but the present disclosure is not limited to this example. The "predetermined reduced voltage state" may be a state where the voltage of the first power path 81 is lower than the voltage of the second power path 82 by a fixed value or more. In either case, in "the case of a normal state that is not the predetermined reduced voltage state", the supply of power to the load 101 via the second power path 82 is blocked. Also, in either case as well, if the second control is performed, the control unit 16 may cause the voltage conversion unit 30 to perform the conversion operation such that the output voltage in the normal state (specifically, the voltage applied to the second power path 82 is an output voltage that is slightly lower than the voltage applied to the first power path 81) is applied to the second conductive path 42.

In the first embodiment, when the first control is performed by the control unit 16 in response to the first condition being met, the first control is performed until the termination condition of the first control is met, and the control unit 16 can switch from the first control to the second control in response to the termination condition of the first control being met, but the present disclosure is not limited to this example. For example, the first control may be performed until the termination condition of the first control is met, and then the control may be switched from the first control to the third control. For example, a configuration may be employed where the first control is switched to the third control before the charging voltage of the power storage unit 12 reaches the second threshold value (for example, the threshold value indicating full charge), and then the third control is switched to the second control after the charging voltage of the power storage unit 12 has reached the second threshold value as per the third control.

In the first embodiment, an example of the selection unit was given, but the selection unit 70 is not limited to a configuration such as that shown in FIG. 1 (a configuration including the diodes 71 and 72), and a configuration that can realize reverse-flow prevention control similar to that of the selection unit 70 shown in FIG. 1 may be employed. For example, a first relay realized by a mechanical relay or a semiconductor relay may be provided instead of the diode 71, and a second relay realized by a mechanical relay or a semiconductor relay may be provided instead of the diode 72. It is preferable that the first relay and the second relay are configured to, for example, allow bilateral passage of a current when on, and block bilateral passage of a current when off. If such a configuration is employed, the charge/discharge control apparatus 10, the load 101, or even another electronic control apparatus monitors the voltage of the power supply unit 91 (for example, the voltage of the first power path 81), and turns on the first relay and turns off the second relay when the voltage of the power supply unit 91 is at or above a predetermined threshold value, and turns off the first relay and turns on the second relay when the voltage of the power supply unit 91 is less than a predetermined threshold value. Alternatively, an un-shown switching apparatus may turn on the first relay and turn off the second relay when the voltage of the first power path 81 is greater than or equal to the voltage of the second power path 82, and turn off the first relay and turn on the second relay when the voltage of the first power path 81 is smaller than the voltage of the second power path 82.

In the first embodiment, the selection unit 70 is configured as a component that is different from the charge/discharge control apparatus 10, but the selection unit 70 may be incorporated as a part of the charge/discharge control apparatus 10. Alternatively, the selection unit 70 may be incorporated in the load 101 as a part of the load 101.

The embodiments disclosed herein are exemplary in all respects, and should be construed as not being limitative. The scope of the present disclosure is indicated by the scope of the appended claims rather than the above description, and all changes that fall within the same essential spirit as the scope of the claims are intended to be included therein.

What is claimed is:

1. A charge/discharge control apparatus that controls charge/discharge in a power supply system that includes a power supply unit, a power storage unit, a first power path that is a path for supplying a load with power that is based on the power supply unit, and a second power path that is a path for supplying the load with power that is based on the power storage unit, the charge/discharge control apparatus comprising:
  a first conductive path that is a path on which power that is based on the power supply unit is transmitted;
  a second conductive path that is interposed between the second power path and the first conductive path;
  a third conductive path that is electrically connected to the power storage unit;
  a voltage conversion unit configured to perform voltage conversion between the second conductive path and the third conductive path;
  a first switch that is provided between the first conductive path and the second conductive path, and is configured to switch between an on state where a current is allowed to flow from the first conductive path to the second conductive path and an off state where the current is blocked;
  a second switch that is provided between the second conductive path and the second power path, and is configured to switch between an on state where a current is allowed to flow from the second conductive path to the second power path, and an off state where the current is blocked; and
  an auxiliary charging unit configured to switch between a supply state where power is supplied to the power storage unit via a path different from a path including the voltage conversion unit, based on power supplied via the first conductive path, and a stopped state where the supply of power to the power storage unit is stopped;
  wherein the control unit performs first control, second control, and third control,
  the first control being control that turns on the first switch while causing the voltage conversion unit to perform an operation of stepping up or stepping down the voltage applied to the second conductive path and applying the thus stepped-down or stepped-up voltage to the third conductive path,
  the second control being control that turns off the first switch and turns on the second switch, sets the auxiliary charging unit to the stopped state, and causes the voltage conversion unit to perform an operation of stepping up or stepping down the voltage applied to the third conductive path and applying the thus stepped-up or stepped-down voltage to the second conductive path, and
  the third control being control that turns off the first switch and turns on the second switch, sets the auxiliary charging unit to the supply state, and causes the voltage conversion unit to perform a conversion operation of stepping up or stepping down the voltage applied to the third conductive path and applying the thus stepped-up or stepped-down voltage to the second conductive path.

2. The charge/discharge control apparatus according to claim 1,
  wherein, if the power supply system enters a predetermined reduced voltage state where the voltage of the first power path is lower than the voltage of the second power path occurs, power is supplied to the load via the second power path, and if the power supply system enters a normal state that is not the predetermined reduced voltage state, the supply of power to the load via the second power path is blocked, and
  in a case of performing the second control, the control unit causes the voltage conversion unit to perform the conversion operation such that an output voltage that realizes the normal state is applied to the second conductive path, and if a predetermined condition is met while the second control is being performed, the control unit switches to the third control.

3. The charge/discharge apparatus according to claim 2, wherein the predetermined condition is that the output voltage applied to the third conductive path by the power storage unit falls to a threshold value or below.

* * * * *